United States Patent [19]
Müller

[11] 4,295,168
[45] Oct. 13, 1981

[54] METHOD AND SYSTEM TO OPTIMIZE RECORDING CONDITIONS IN MAGNETIC RECORDING SYSTEMS

[75] Inventor: Rolf Müller, Seeheim, Fed. Rep. of Germany

[73] Assignee: Robert Bosch GmbH, Stuttgart, Fed. Rep. of Germany

[21] Appl. No.: 966,858

[22] Filed: Dec. 6, 1978

[30] Foreign Application Priority Data

Dec. 27, 1977 [DE] Fed. Rep. of Germany ....... 2758307

[51] Int. Cl.$^3$ .......................... G11B 5/47; G11B 27/36
[52] U.S. Cl. .......................................... 360/66; 360/31
[58] Field of Search ...................... 360/31, 25, 65, 66, 360/67, 68

[56] References Cited

U.S. PATENT DOCUMENTS

| | | | |
|---|---|---|---|
| 2,791,640 | 5/1957 | Wolfe | 360/31 |
| 3,564,160 | 2/1971 | Temes | 360/31 |
| 4,011,585 | 3/1977 | Sunaga | 360/25 |

*Primary Examiner*—Vincent P. Canney
*Attorney, Agent, or Firm*—Frishauf, Holtz, Goodman & Woodward

[57] ABSTRACT

To optimize recording current flow, either for maximum signal output or for best linearity of a changing input signal with respect to output voltage, and provide for automatic optimization of the recording signal level, a ramp or sawtooth wave generator is connected to a recording head, the recorded signal is immediately read and differentiated and the differentiated signal is level detected, for example for zero level for maximum output voltage or for a predetermined level before substantial change of the differentiated signal has resulted, thus providing for optimum linearity, the optimum signal level—as desired—being stored in a memory and used to control the excitation current for subsequent excitation of the transducer heads by a data source.

20 Claims, 4 Drawing Figures

METHOD AND SYSTEM TO OPTIMIZE RECORDING CONDITIONS IN MAGNETIC RECORDING SYSTEMS

The present invention relates to the art of magnetic recording, and especially to magnetic tape recording, and more particularly to determination of optimum recording conditions, for example recording current to record data on magnetic tape so that the reproduced data will have maximum signal level.

BACKGROUND AND PRIOR ART

Magnetic tape recording apparatus, and particularly apparatus used in connection with video tape recording (VTR), generally use rotating transducer heads. In one system which has been proposed, the signal recording is carried out approximately perpendicularly to the path of the tape. During optimization, the speed of the tape is reduced to about one-third of its normal value so that information which is recorded by one head can immediately be read again by the subsequent head. The optimization of recording is effected by rotating the level control in a recording amplification network—manually—until a reproducing level indicator shows a maximum.

The optimization system thus used is manually controlled, requiring substantial time for adjustment and, additionally, skill in setting the proper adjustment level. The optimum recording thus obtained is subjective in that the maximum signal level which is sensed is not always read at the same level by different operators so that the true optimum level is not always attained and reproducible results are difficult to achieve.

THE INVENTION

It is an object to provide an automatic system to rapidly and accurately determine optimum recording levels, independently of subjective influences derived from the skill, or lack thereof, of an operator.

Briefly, the present invention is based on the realization that an increasing level of recording signal current will not result in an equally increasing level of reproduced output signal, but rather will result first in a rising output voltage which reaches a maximum and then actually drops off. A good illustration of the transfer curve of input current to output voltage is illustrated in FIG. 2. By differentiating the reproduced output voltage and sensing for a predetermined differentiated level, for example, and preferably, the zero or null level, at which the slope of the output voltage becomes zero, the maximum, that is, the optimum output voltage to be obtainable can be readily determined.

In accordance with a feature of the invention, a differentiator is connected to a or reproducing tape head and a level detector detects the level of the differentiated signal which, for example, can be null or zero for maximum output, or at a level above null or zero, or when the slope changes, if linearity between input current and output signal is of primary importance, that is to say, is the optimum for the particular system or process, rather than maximum signal level. A memory can be provided furnishing a representation of the recording current at which the selected optimum is attained.

The method and system effectively avoid the disadvantages of the prior art process in that subjective operator errors are eliminated; optimization is carried out rapidly, precisely, reliably, and reproducibly.

In accordance with a feature of the invention, it is desirable to decrease the operating speed of the tape, maintaining, however, the rotational speed of the transducer heads. The tape speed should be reduced as much as possible, in some instances even down to speed zero, that is, the tape can be stopped. The slower the tape operates, the more previously recorded information can be immediately scanned and read or reproduced again. The decrease in tape speed, and hence immediate re-reading of the previously recorded data, can be obtained by increasing the operating speed of the heads to compensate for decreased tape speed. If the heads are operated at a higher rate, then they must be capable of accepting the higher mechanical loading and compensation is desirably introduced into the system to compensate for the changed transfer characteristics of the signal transducing conditions between tape and heads which, now, operate at a higher speed than under ordinary transducing conditions.

The type or mode of recording and reproduction can be different, particularly in magnetic tape apparatus using multiple heads. For example, recording and reproduction can be carried out with the same recording head; recording and reproduction may be carried out, however, also with alternatingly different transducing heads if the transducing structure is of the multiple-head type.

The method as well as the apparatus to carry out the method are simple and ensure rapid and precise optimum recording conditions.

DRAWINGS

Figure 1:
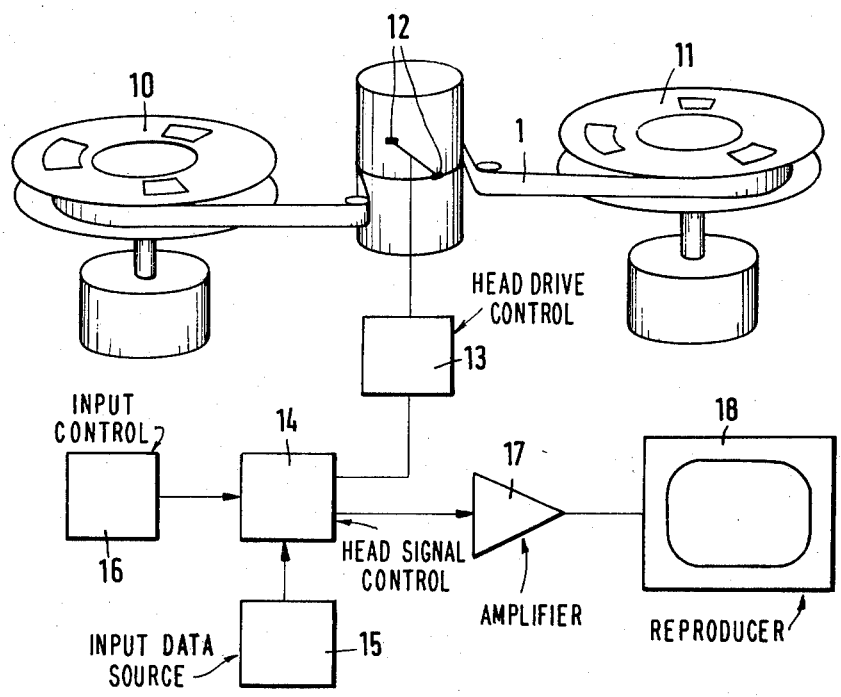
FIG. 1 is a highly schematic diagram of a VTR recording system with the optimization system of the present invention.
Figure 3:
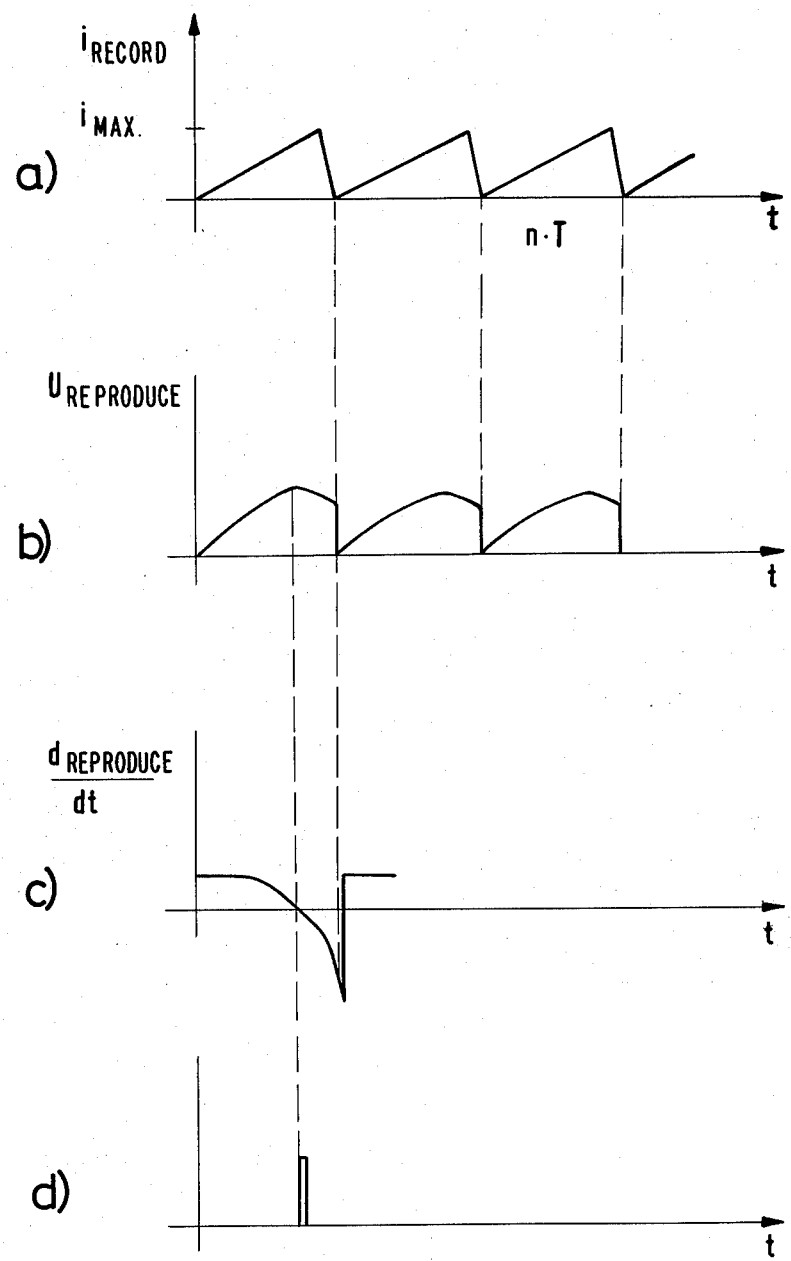
Figure 4:
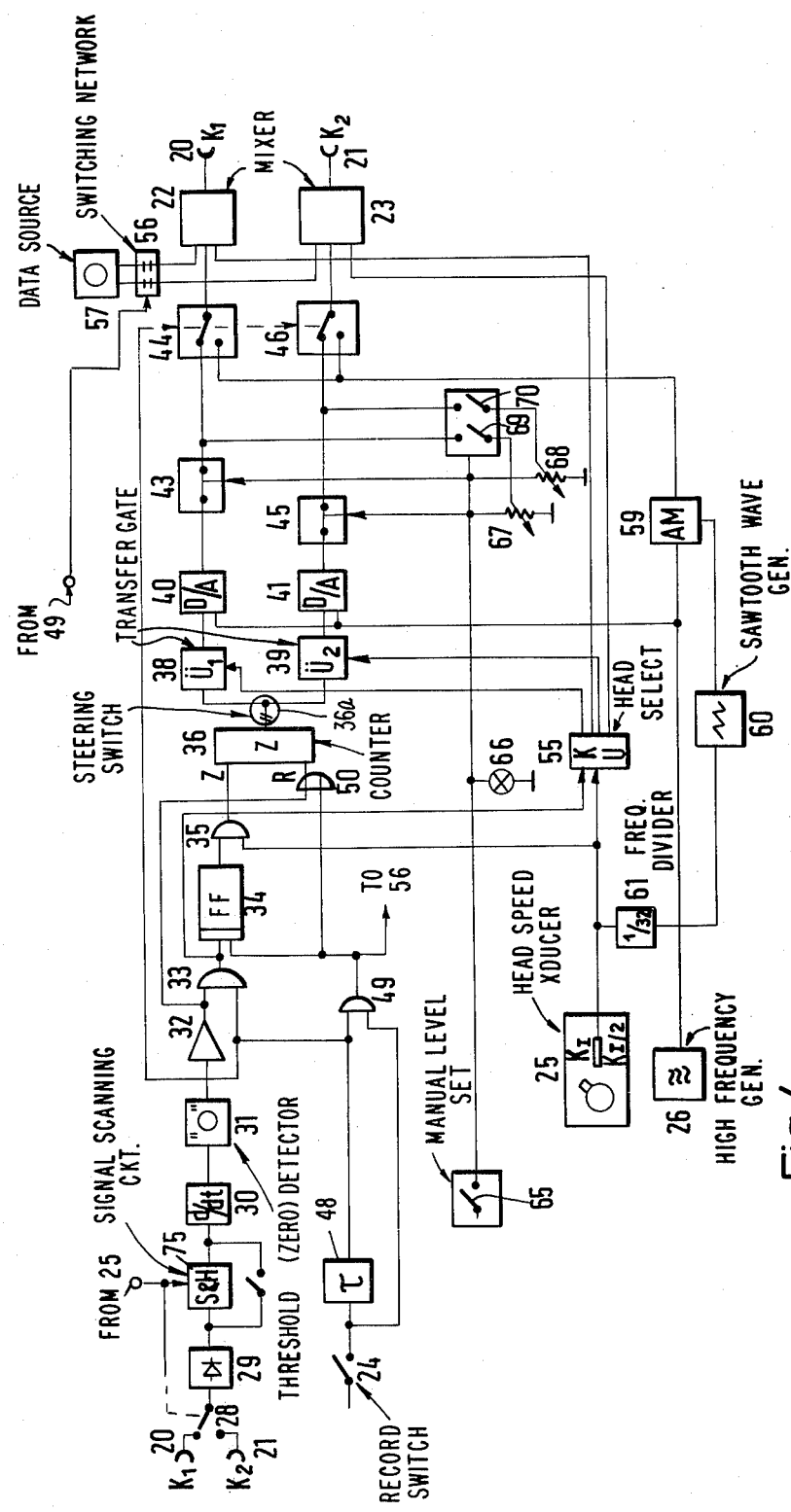

FIGS. 3a—a, is a series of signals used in connection with the explanation of the method and operation of the apparatus; and FIG. 4 is a general schematic block circuit diagram illustrating a system and apparatus to determine optimum recording conditions in the system of FIG. 1.

Optimization is desirable to excite or pass current through the transducer heads in such a manner that reproduced data will have maximum value or highest degree of linearity with respect to different recording current levels. It is desirable to obtain an output signal which has as little background noise as possible, that is, provides a high signal-to-noise ratio when reproduced or played back. Tape recording equipment, and particularly VTR equipment, must be aligned or adjusted from time to time due to wear on the transducer heads and differences in characteristics of different VTR tape materials.

A typical VTR system has two reels 10, 11 feeding and winding tape 1 over a recording cylinder, the tape being guided over the cylinder in a spiral path. A group of record/reproduce transducer heads 12 is located within the cylinder and rotates in a gap thereof. The group of heads 12 is driven under control of the head drive control unit 13. The important component of the system, from a signal transfer point of view, is a head signal control unit 14 which controls the current supply to the heads 12, for example through the head drive control 13 as shown. The head signal control unit receives input data from an input data source 15 and provides the signals to the transducer heads 12 under control of an input control unit 16. The signals being read by the heads 12 are amplified in an amplifier 17 and reproduced in a reproducer 18, for example a video display unit.

The system as shown in FIG. 1 provides for a spiral path of the tape 1 over the cylinder. This is a customary arrangement but the type of track which is recorded on the tape has no bearing on the present invention; it is only necessary for the purposes of the present invention that signals, once recorded on the tape, can be read again immediately thereafter. Thus, it is possible to have recording in transverse or longitudinal direction, and entirely independently of whether the magnetic heads and/or the magnetic tape itself carries out continuous or periodic movement.

The various types of tapes which are commercially available may have different types of coatings; the different coatings, themselves, have different magnetization characteristics. The coercive forces, for example, are different in different tapes. Due to wear on the heads, the record/reproducing conditions change during operating time of a VTR apparatus, even if the apparatus is always operated with the same type of tape. All those factors—wear on the apparatus, differences in tape characteristics and quality-change the signal-to-noise ratio, or the background noise level. To obtain optimum signal transfer quality, it is important to optimize the recording currents being supplied to the various transducer heads repeatedly during the operating life of the apparatus. The automatic optimization system and method permits, and desirably is carried out, each time at the initiation of an ordinary recording cycle, that is, when new information is to be recorded. It may be omitted if data which have just been recorded are re-recorded, for example to cancel erroneously entered data which are being erased as the new data are being entered.

Figure 2:
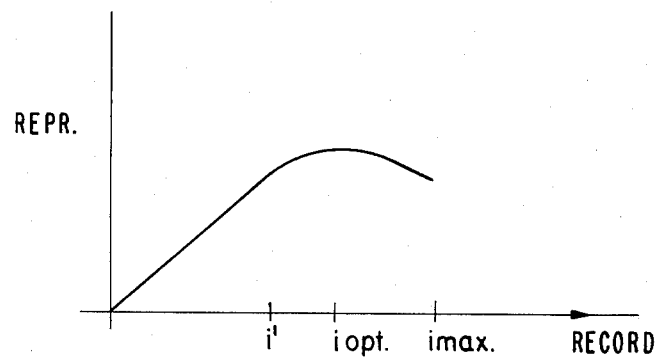
FIG. 2 shows the relationship between recording current and reproducing voltage.

The signal transfer characteristics upon recording and reproduction of typical magnetic tape are shown in FIG. 2. The abscissa shows recording current, the ordinate shows reproducing voltage. As the curve clearly shows, an increase in recording current results in an increase in the reproduced signal up to a point. If the recording current is increased linearly, the reproduced voltage also rises initially linearly. As the recording current increases, however, the reproducing voltage becomes flatter, that is, its slope becomes less; eventually, the curve becomes flat—slope zero—and then the reproducing voltage even drops off.

To obtain highest signal-to-noise ratio, it is desirable to obtain a reproduce signal which is as high as possible. It is thus necessary to determine that value of recording current in which the reproduced voltage is a maximum. For this condition, the maximum reproduced voltage will result in the optimum of the obtainable reproduced signal—from an amplitude or signal level point of view——and for most reproducing systems it is desirable to determine the optimum signal current which provides this maximum voltage. The current at which the reproduction voltage is a maximum is shown in FIG. 2 at $i_{opt}$.

In some other systems, it is desirable to achieve maximum linearity between recording current and reproduced signal voltage. The maximum recording current within the range of essentially linear transducing characteristics is indicated in FIG. 2 at $i'$, that is, at approximately the position where the slope of the transducing curve of FIG. 2 begins to deviate from an essentially straight line.

The system in accordance with the present invention utilizes the mathematical relationships which can readily be derived from FIG. 2 by differential calculus. If the curve of FIG. 2 is differentiated, a slope of zero or null will indicate the point of optimum recording current resulting in maximum output. If the recording current at slope zero is sensed and stored, then the stored output will be available as a control signal to provide for optimum recording current, which can be used to continuously control the recording signal level. If the detection is with respect to a signal level at which the differential begins to deviate from an essentially uniform value—representative of the straight line portion of the curve of FIG. 2—and that value is stored, then that value will be representative of the maximum range of essentially linear transfer of recording current with respect to reproduced output voltage.

The relationship can best be understood by reference to FIG. 3: Graph a of FIG. 3 shows a recording current being supplied to a typical transducer head in the form of a sawtooth wave or ramp wave form. The cycling time or period of the sawtooth wave of graph a is preferably about 0.21 sec. This is particularly suitable for usual VTR equipment given the mechanical and electrical conditions thereof. The various recorded signals should be read or reproduced as rapidly as possible after recording. To obtain exact optimization, changes between adjacent recording events should be as small as possible. It is additionally necessary, however, that the current for recording—when optimizing the system—clearly exceed the optimum value so that the slope for which the test is to be made, for example slope zero, can be clearly determined. The time of 0.21 sec is 32 times the reciprocal of the speed of revolution of a head wheel of usual VTR equipment.

The reproduced signal, reproduced by the transducer heads, is shown in graph b of FIG. 3. As can be seen, this curve is essentially the same as the curve of FIG. 2.

If the curve of FIG. 3, graph b, or of FIG. 2 is differentiated, then the results will be as seen in FIG. 3, graph c. This curve, as illustrated in the graph c, has, in the beginning, an essentially constant positive slope, then dropping in level until, at optimum reproduced voltage level, it passes through zero or null. At the drop-off curve portion of the reproducing current, a negative peak of the signal will occur. Upon subsequent recording of the next cycle, the differentiated signal will again reach the normal level indicative of the constant initial portion of the slope of the signal of graph b of FIG. 3, or of FIG. 2. Thus, over one cycle of the recording signal, two passages through null or zero of the differentiated signal will occur—see graph c of FIG. 3—of which only the first passage through zero can be effectively used to optimize recording current. It is a comparatively simple matter to sense the first passage through zero, or at a different level, as determined by a properly set level detector, and to use the so detected signal for further control of the recording current. The signal which can be used, for example, to optimize the output level of the reproduced voltage is illustrated in graph d of FIG. 3. This signal, when correlated with the recording current—graph a of FIG. 3—then determines the optimum recording current level. If a level different from the zero or null passage of the graph c of FIG. 3 is desired, for example at a point at which the differentiated value drops below the horizontal portion of the graph c of FIG. 3 by a predetermined amount, then the signal of graph d of FIG. 3 will occur somewhat earlier and, by correlation of the sawtooth wave of graph a, the maximum current level within the linear range of recording current—reproduced voltage will again be determined.

The duration of one optimization cycle corresponds, as a maximum, to the duration of a period of the sawtooth wave or ramp signal of graph a of FIG. 3. Since, in a multiple-head, for example a dual-head system, optimization is required independently for each head, the overall time for optimization is the number of heads times 0.21 sec.

System and apparatus for optimization of signal transfer, with reference to FIG. 4: Two transducer heads, $K_1$ and $K_2$ (shown twice on the drawings for simplicity of representation) are positioned in transducing relation to a magnetic tape, for example the VTR apparatus of FIG. 1. The transducing heads $K_1$, $K_2$ each have a mixer stage 22, 23 connected thereto. The system receives input signals by transducing of magnetic signals by the heads 20, 21, and a switching signal from switch 24 which characterizes that the system being placed in operation; further, a speed signal is provided from a speed transducer 25 which senses the revolving speed of the transducer heads. Additionally, a high-frequency generator 26 provides a high-frequency signal. The play or reproduce signal outputs from heads 20, 21 are connected to a transfer switch 28 which is in turn connected to a rectifier 29 to demodulate the carrier frequency of the recorded signal. The demodulator 29 is connected to a differentiator 30 and a level detector 31, typically a zero detector, to detect the transition of the differentiated signal from output of differentiator 30 through zero or null. The zero detector 31 responds only upon transition from positive to negative region, but not in the reverse. An inverter 32 is connected to the output of zero detector 31 which, in turn, is connected to one input of an AND-gate 33, the output of which is connected to a flip-flop (FF) 34 which, in turn, is connected to a further AND-gate 35. The output of the second AND-gate 35 is connected to the count input of a counter 36. The output of the counter is, bipolar and can be selectively connected by steering switch 36a to energize respective transfer gates 38, 39. Gates 38, 39 may also be polarity-responsive. Gates 38, 39 are connected to a digital-analog (D/A) converter 40, 41, respectively. The transfer gates 40, 41 are connected through controlled switches 43, 45 and 44, 46, respectively, to the mixers 22, 23.

The output of the record switch 24 is connected directly to an AND-gate 49 and through a timing circuit 48 to a negating input. The output of the timing circuit 48 is additionally connected to AND-gate 33 and further provides a switching control signal for the switches 44, 46.

The reset input of counter 36 has an OR-gate 50 connected to its input, the inputs of which are connected with the output of the inverter 32 and with the AND-gate 49, respectively. The output of the AND-gate 49 is, further, connected to the second input of FF 34.

A head selector stage 55 receives input signals from the outputs of the AND-gate 33 and from the head speed transducer 25. The output of the head selector stage is connected to the transfer gates 38, 39 and to the mixing stages 22, 23, respectively. In ordinary normal record operation, mixing stages 22, 23 will receive signals from a data source 57 through a suitable switching and matching network 56.

The high-frequency generator 26 is connected to the two D/A converters 40, 41, providing a maximum output signal thereto. It is additionally connected to an amplitude modulation stage 59 modulating the high frequency from the generator 26 in sawtooth wave form. The modulation signal is derived from a sawtooth wave generator 60 which is triggered by the output from the head speed transducer 25 through a frequency divider 61, dividing the frequency from the head speed transducer 25 by 1/32.

A manual level set circuit 65 is provided, the output of which from the switch—with respect to ground or chassis—can be indicated by an indicator lamp 66 and which is connected to two potentiometers 67, 68. The two switches 43, 45 are controlled by the output signal from the manual level set switch 65. The switches 69, 70 likewise are controlled by the circuit 65. If an output signal is derived from the manual level set switch 65, the switches 69, 70 connect the sliders of potentiometers 67, 68 as inputs to the respective switches 44, 46, switches 43, 45 then being opened.

A signal scanning circuit 75 is connected between the demodulator 29 and the differentiator 30, bridged by a switch. The signal scanning circuit 75 as well as switch 28 are controlled by a speed pulse from the head speed transducer 25. Depending on the type of optimization, the signal scanning circuit is used with a multi-head system.

Operation: Let it be assumed that the head selector stage 55 places head 1 in record position and the head 2 in reproduce position. The switches other than the record/reproduce switch are in quiescent position, as shown in FIG. 4.

Upon closing of the record switch, the timing circuit 48 provides a positive pulse of a predetermined length. This positive pulse controls the switches 44 and 46 to change into the other position, that is, to change over from the position shown in the drawing to receive the amplitude modulated high-frequency wave from high-frequency generator 26 and modulator 59, so that the sawtooth wave will be applied to the mixing stages 21, 23. The output of the AND-gate 49 will become an enabling signal, upon closing of the switch 24, only after the time duration as determined by the timing circuit 48. This will cause reset of the counter 36 and circuit 56 will be enabled. The timing duration of the circuit 48 determines the time available for carrying out the optimization step. After elapse of the timing interval from circuit 48, the switching network places the data source in communication with the mixers and the heads 20, 21.

AND-gate 33 is continuously conductive during the time of the timing interval determined by timing circuit 48 unless the zero detector 31 provides an output signal, indicative of a passage through zero of the input thereto. Consequently, the output pulses of head speed transducer 25 are transferred through the AND-gate 35 to the count input Z of the counter 36. The counter state of counter 36 increments and since the head selector stage 55 has provided an output signal for a selected head, for example head 38, the output from the D/A converter 40 will provide a resulting output signal thereat. The sawtooth wave output signal of the head 1 is read again by the head 21, $K_2$ 2 and rectified in rectifier or demodulator 29. The change, with respect to time, of the reproduced signal is differentiated in a differentiator 30 and, when the differentiated signal passes through zero, corresponding to a constant reproduced signal, with respect to time, the zero detector 38 will switch its output to a positive level. At that instant of time, the recording signal has its optimum. This value is stored in a memory. Storage is effected by blocking the transfer gate 38. The counter 36 is also reset over terminal R back to zero. The value last provided by the D/A converter 40 is held or stored therein and is thus available for further control or processing.

After termination of the first optimization step, the head selector stage 55 reverses the respective heads, and the same optimization process is carried out for the second head.

After optimization, the outputs of the two D/A converters 40, 41 will have optimum values for the respective energization of the head stored therein. For actual recording with the optimally energized heads, it is only necessary to await expiration of the timing interval determined by the timing circuit 48. When the timing interval has elapsed, the switches 44, 46 will change over to the position shown in the drawing, FIG. 4, and the values stored in the D/A converters, representing optimal excitation, are connected to the mixer stages 22, 23 so that data from data source 57 passed through the switching network 56 can likewise be applied to the mixer stages for recording by the heads 20, 21 at the level determined by the setting of the D/A converters 40, 41. Thus, recording will be carried out at optimum recording level.

The manual level set 65 permits manual optimization of head excitation current. Optimization by hand can be carried out through the potentiometer 67, 68 for both heads 20, 21. This system may be necessary if, for example, separate operating sources are available for the heads 20, 21 and for the optimization system, and there should be a failure in power supply for the optimization system.

Various ways of optimizing head current can be obtained. For example, the first head can be operated continuously in the record mode, and the second head continuously in the read or reproduce mode to reproduce the just recorded information. It may be desirable in some instances, however, to record and reproduce by the same and to let the record/reproduce cycles operate in parallel. The respective control of which head operates in the record mode and/or the reproduce mode, and when, is carried out by the head selector stage 55. A signal scanning circuit 75, connected in series after the demodulator 29, may be necessary in order to positively allocate signals sensed by either head, and switched by the switch 28 to a specific track. For proper allocation and timing of which head operates in which mode, a control signal is applied to the signal scanning circuit 75 from head speed transducer 25.

The system in accordance with FIG. 4 has been shown to operate with two transducer heads, the excitation currents of which are to be optimized. If more than two transducer heads are used, more optimization cycles are needed, requiring a correspondingly greater number of D/A converters if the excitation currents for each head are to be optimized separately.

Various changes may be made in the circuit of FIG. 4. For example, the wave shape causing a rise in the excitation current need not be the ramp or sawtooth wave as shown; different curves may be used. Different relationships of the optimization phase and speed may be used, as desired. A specific variation is a different determination of the optimum excitation signal. If linear reproduction is of primary importance, or considered the "optimum", then the reproduce signal may not have a final gradient or slope of zero or null value. The optimum, for any particular operating mode then becomes a question of threshold and the zero detector 31 which, in the usual case, is a threshold detector will then be so set that its threshold deviates from zero and provides an output signal when and if the threshold level thereof is passed—for example at a level just under the horizontal portion of the reproducing voltage, as seen in graph c of FIG. 3.

The system of FIG. 4 utilizes a combination D/A converter and memory. Other circuit arrangements are conceivable, for example a single D/A converter could be connected to the output of counter 36, the output of which is connected through suitable transfer gates to respective memory circuits, such as sample-and-hold circuits, to provide an output level command signal representative of the respective optimally desired excitation current for a respective transducer head.

Various other changes and modifications may be made within the scope of the inventive concept.

I claim:

1. Method to essentially optimize recording current flow through a magnetic transducer head (20, 21) to obtain output signals of a desired signal level, and wherein signals are recorded on a predetermined track or track portion of magnetic tape (1) and the signals are thereafter read or reproduced from said track or track portion, comprising the steps of
   providing a recording signal;
   changing in increasing direction the signal level of the recording signal and recording said signal of increasing level on said track or track portion;
   reading and reproducing the recorded signal from the track or track portion and deriving a reproduced electrical signal;
   differentiating the reproduced signal with respect to the recording signal level;
   and determining the recording signal level at a selected predetermined level of the differentiated signal.

2. Method according to claim 1, wherein the step of providing an increasing recording signal level comprises providing an essentially linearly increasing recording signal.

3. Method according to claim 1, wherein the predetermined level of the differentiated signal is the approximate null or zero differentiated signal level indicative of minimum rate of change of reproduced signal level and hence of maximum of recording signal.

4. Method according to claim 1, wherein the predetermined level of the differentiated signal is the level at which the differentiated signal changes beyond a predetermined value from a prior value.

5. Method according to claim 1, further including the step of changing the relative tape-to-head speed while the optimizing steps are being carried out.

6. Method according to claim 5, wherein the tape speed is decreased.

7. Method according to claim 5, wherein the recording speed is increased.

8. Method according to claim 5, wherein the reproducing speed is increased.

9. Method according to claim 5, wherein the tape speed is reduced to speed zero so that the tape is stopped.

10. Method according to claim 1, wherein the recording and reading steps are carried out with the same transducer head (20, 21).

11. Method according to claim 1, wherein the recording and reproducing steps are carried out with respectively different transducer heads (20, 21).

12. Apparatus to optimize recording current flow through a magnetic transducer head (20, 21) to obtain output signals of desired signal level, wherein the signals are recorded on a predetermined track or track portion of magnetic tape (1) and the signals are thereafter reproduced from said track or track portion, comprising a signal generator (60) providing a recording signal of signal level which increases with respect to a reference variable;

a reproducing signal circuit, connected to at least one magnetic transducer head and providing a reproduced electrical signal;

a differentiating stage (30) connected to the reproducing signal circuit to differentiate the signal with respect to signal level whereby the differentiated signal will be representative of the differential of the reproduced electrical signal with respect to recording signal level;

a threshold detector (31) detecting a predetermined threshold level of the differentiated reproduced signal;

and control circuit means (36, 40, 41, 22, 23) including memory means (36, 40, 41) controlling excitation signals subsequently applied to the transducer head as a function of the threshold level determined by the threshold detector (31).

13. Apparatus according to claim 12, wherein the signal generator (60) is a sawtooth wave or ramp signal generator.

14. Apparatus according to claim 12, further including a signal scanning circuit (75) connected in advance of the differentiating stage.

15. Apparatus according to claim 12, wherein the threshold detector (31) provides an output at a threshold level of zero or null, and when the output of the differentiator changes from positive to negative, and the memory means (40, 41) stores that value of the signal applied by the signal generator (60) at which the threshold detector detects the null passage of the differentiated signal derived from the differentiating stage (30).

16. Apparatus according to claim 12, wherein the threshold detector (31) is set for a threshold level at which the gradient or slope of change of the output signal from the differentiating stage (30) changes beyond a predetermined level;

and the memory means (40, 41) stores the value of the signal level supplied by the signal generator (60) at which said threshold level is passed.

17. Apparatus according to claim 12, wherein the memory means further includes a counter (36).

18. Apparatus according to claim 12, wherein the memory means includes a hold-type circuit (40, 41).

19. Apparatus according to claim 12, further including a timing circuit (48) energizing said signal generator (60) providing a recording signal of increasing signal level, the timing circuit, after elapse of the time period of the timing signal, disconnecting said signal generator (60) from connection to the respective transducer head and connecting, instead, a data source to the respective transducer head, the excitation current for the transducer head, for excitation as determined by said data source, being controlled by said control circuit means.

20. Apparatus according to claim 12, further including a manual override level set circuit (65; 67, 68, 69, 70) to set the excitation current for the transducer head for excitation thereof under control of a data source (57).

* * * * *